(12) United States Patent
Pollard, Jr.

(10) Patent No.: US 12,354,454 B2
(45) Date of Patent: Jul. 8, 2025

(54) CHARGING STATION WITH INTEGRAL SMOKE AND CARBON MONOXIDE ALARMS

(71) Applicant: DISH Network L.L.C., Englewood, CO (US)

(72) Inventor: Jimmy A. Pollard, Jr., Boiling Springs, SC (US)

(73) Assignee: DISH Network L.L.C., Englewood, CO (US)

( * ) Notice: Subject to any disclaimer, the term of this patent is extended or adjusted under 35 U.S.C. 154(b) by 95 days.

(21) Appl. No.: 17/960,118

(22) Filed: Oct. 4, 2022

(65) Prior Publication Data

US 2024/0112557 A1 Apr. 4, 2024

(51) Int. Cl.
*G08B 17/117* (2006.01)
*G08B 5/36* (2006.01)
*H02J 7/00* (2006.01)
*H02J 50/10* (2016.01)
*G08B 29/14* (2006.01)

(52) U.S. Cl.
CPC ............ *G08B 17/117* (2013.01); *G08B 5/36* (2013.01); *H02J 7/0042* (2013.01); *H02J 50/10* (2016.02); *G08B 29/145* (2013.01)

(58) Field of Classification Search
CPC ...... G08B 17/117; G08B 5/36; G08B 29/145; H02J 50/10; H02J 7/0042

USPC ........................................................ 340/521
See application file for complete search history.

(56) References Cited

U.S. PATENT DOCUMENTS

| | | | | |
|---|---|---|---|---|
| 5,774,038 | A | * | 6/1998 | Welch ................. G08B 17/117 340/628 |
| 10,541,546 | B1 | * | 1/2020 | Dowdy ................. H02J 7/0045 |
| 10,601,973 | B1 | * | 3/2020 | Raghunathan ......... H01R 27/00 |
| 11,804,115 | B1 | * | 10/2023 | Kelsch .............. G08B 13/1418 |
| 2009/0278493 | A1 | * | 11/2009 | Alden ................... H02J 7/0042 320/108 |
| 2014/0368163 | A1 | * | 12/2014 | Ho ........................ H02J 7/0042 320/108 |
| 2015/0069965 | A1 | * | 3/2015 | Verschueren ........... H02J 50/10 320/108 |
| 2017/0018947 | A1 | * | 1/2017 | Chien ................... H01F 27/255 |
| 2017/0033587 | A1 | * | 2/2017 | Hong ................. H02J 7/00034 |
| 2017/0047751 | A1 | * | 2/2017 | Fernandes ............. H02J 7/0044 |
| 2018/0123379 | A1 | * | 5/2018 | Ha .......................... H02J 50/80 |
| 2018/0287414 | A1 | * | 10/2018 | Teich .................... H02J 7/0042 |
| 2019/0237985 | A1 | * | 8/2019 | Piunti .................... H02J 50/10 |
| 2020/0412177 | A1 | * | 12/2020 | Sato ....................... H02J 50/10 |
| 2021/0391743 | A1 | * | 12/2021 | Kacperski ............. H02J 7/0071 |
| 2022/0051537 | A1 | * | 2/2022 | Dong ..................... B60L 8/003 |
| 2022/0109331 | A1 | * | 4/2022 | Ventimiglio ............. H02J 7/02 |
| 2023/0014262 | A1 | * | 1/2023 | Wu ........................ G06F 1/1632 |
| 2023/0336031 | A1 | * | 10/2023 | Sanchez ................. H02J 50/10 |
| 2024/0112557 | A1 | * | 4/2024 | Pollard, Jr. ............ H02J 50/10 |

* cited by examiner

*Primary Examiner* — Zhen Y Wu
(74) *Attorney, Agent, or Firm* — Perkins Coie LLP

(57) ABSTRACT

A charging station including a base, at least one inductive charger carried by the base, a smoke detector supported by the base, and a carbon monoxide detector supported by the base.

17 Claims, 5 Drawing Sheets

CHARGING STATION WITH INTEGRAL SMOKE AND CARBON MONOXIDE ALARMS

TECHNICAL FIELD

The present technology is generally directed to mobile device battery chargers. In particular, several embodiments of the present technology are related to charging stations with integral smoke and carbon monoxide sensors and associated warning indicators.

BACKGROUND

Many people find it convenient to charge their mobile devices next to their beds at night while they sleep. Although unlikely with modern devices, it is possible for the battery in a mobile device to malfunction and overheat. This can lead to concerns about fire and smoke in a sleeping area which may or may not be near a conventional smoke and/or carbon monoxide detector.

SUMMARY

In some aspects, the techniques described herein relate to a charging station, including: a base; at least one inductive charger carried by the base; a smoke detector supported by the base; and a carbon monoxide detector supported by the base.

In some aspects, the techniques described herein relate to a charging station, further including an angled wall extending from the base wherein the at least one inductive charger is enclosed by the angled wall.

In some aspects, the techniques described herein relate to a charging station, wherein the angled wall includes one or more shelves to support a device thereon.

In some aspects, the techniques described herein relate to a charging station, wherein the smoke detector and the carbon monoxide detector are contained in a cylindrical housing disposed on a pole upwardly extending from the base.

In some aspects, the techniques described herein relate to a charging station, further including one or more lights extending along a length of the pole.

In some aspects, the techniques described herein relate to a charging station, further including a cylindrical light positioned on the light pole.

In some aspects, the techniques described herein relate to a charging station, further including a controller configured to receive a signal from at least one of the smoke detector and the carbon monoxide detector and in response, illuminate at least one of the light pole and the cylindrical light.

In some aspects, the techniques described herein relate to a charging station, further including a pair of vertically oriented charging walls, each having an inductive charging coil positioned therein.

In some aspects, the techniques described herein relate to a charging station, further including a horizontal tray extending from a distal end of the angled wall.

In some aspects, the techniques described herein relate to a charging station, further including a controller configured to receive a signal from at least one of the smoke detector and the carbon monoxide detector and in response, disconnect power to the at least one inductive charger.

In some aspects, the techniques described herein relate to a charging station, including: a base; an angled wall extending from the base; at least one inductive charger enclosed in the angled wall; a smoke detector supported by the base; a carbon monoxide detector supported by the base; and a controller configured to receive a signal from at least one of the smoke detector and the carbon monoxide detector and in response, disconnect power to the at least one inductive charger.

In some aspects, the techniques described herein relate to a charging station, wherein the angled wall includes one or more shelves to support a device thereon.

In some aspects, the techniques described herein relate to a charging station, wherein the smoke detector and the carbon monoxide detector are contained in a cylindrical housing disposed on a pole upwardly extending from the base.

In some aspects, the techniques described herein relate to a charging station, further including one or more lights extending along a length of the pole.

In some aspects, the techniques described herein relate to a charging station, further including a cylindrical light positioned on the light pole.

In some aspects, the techniques described herein relate to a charging station, wherein the controller is further configured to receive a signal from at least one of the smoke detector and the carbon monoxide detector and in response, illuminate at least one of the light pole and the cylindrical light.

In some aspects, the techniques described herein relate to a charging station, further including a pair of vertically oriented charging walls, each having an inductive charging coil positioned therein.

In some aspects, the techniques described herein relate to a charging station, further including a horizontal tray extending from a distal end of the angled wall.

BRIEF DESCRIPTION OF THE DRAWINGS

The devices, systems, and methods described herein may be better understood by referring to the following Detailed Description in conjunction with the accompanying drawings, in which like reference numerals indicate identical or functionally similar elements.

Figure 1:
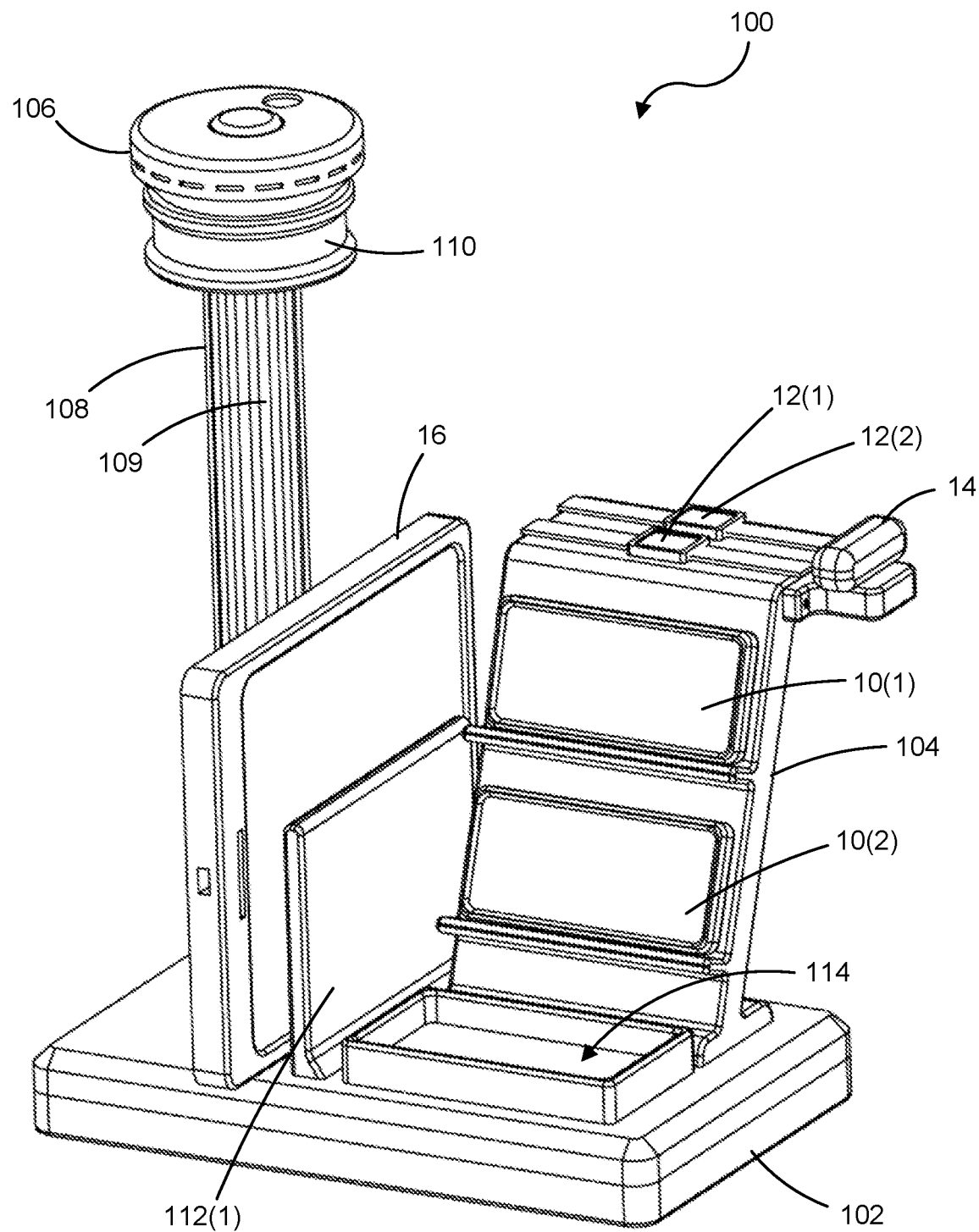
FIG. 1 is an isometric view of a charging station with integral smoke and carbon monoxide alarms according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifica-

DETAILED DESCRIPTION

Various examples of the devices, systems, and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Many people find it convenient to charge their mobile devices next to their beds at night while they sleep. Although unlikely with modern devices, it is possible for the battery in a mobile device to malfunction and overheat. The disclosed technology provides smoke and carbon monoxide detectors integrated with a mobile device charging station. This places the detectors next to the user's bed and very close to the charging devices such that the detectors can immediately detect any smoke and/or carbon monoxide. In the event that a battery overheats, the detectors can activate warning indicators, such as flashing red lights and/or audible alarms. Furthermore, the system can disconnect power to the charging circuitry if smoke and/or carbon monoxide are detected. In some embodiments, the charging station includes temperature sensors that can warn of an overheating device and automatically disconnect power before a problem occurs.

FIG. 1 illustrates a charging station 100 according to some embodiments of the disclosed technology. The charging station can include a base 102 with an angled wall 104 extending from the base 102. A combination smoke detector and carbon monoxide detector 106 is contained in a cylindrical housing and disposed on a light pole 108 that extends upwardly from the base 102. The light pole 108 can include one or more lights 109 extending along a length of the pole. In some embodiments, the light pole 108 also carries a cylindrical light 110 positioned on the light pole underneath the detectors 106. In normal operation the light pole 108 and/or cylindrical light 110 can act as a night light and/or reading light. If smoke or carbon monoxide are detected at combination detector 106, the lights can flash and change colors to red, for example. The light pole 108 and cylindrical light 110 can comprise light emitting diodes (LEDs).

The angled wall 104 supports multiple devices for charging, such as smart phones 10, smart watches 12, and an ear bud pod 14. The base 102 can also include vertically oriented charging walls 112, each having an inductive charging coil positioned therein, to charge one or more tablet devices 16. The base 102 can also include a key/change tray 114.

Figure 2:
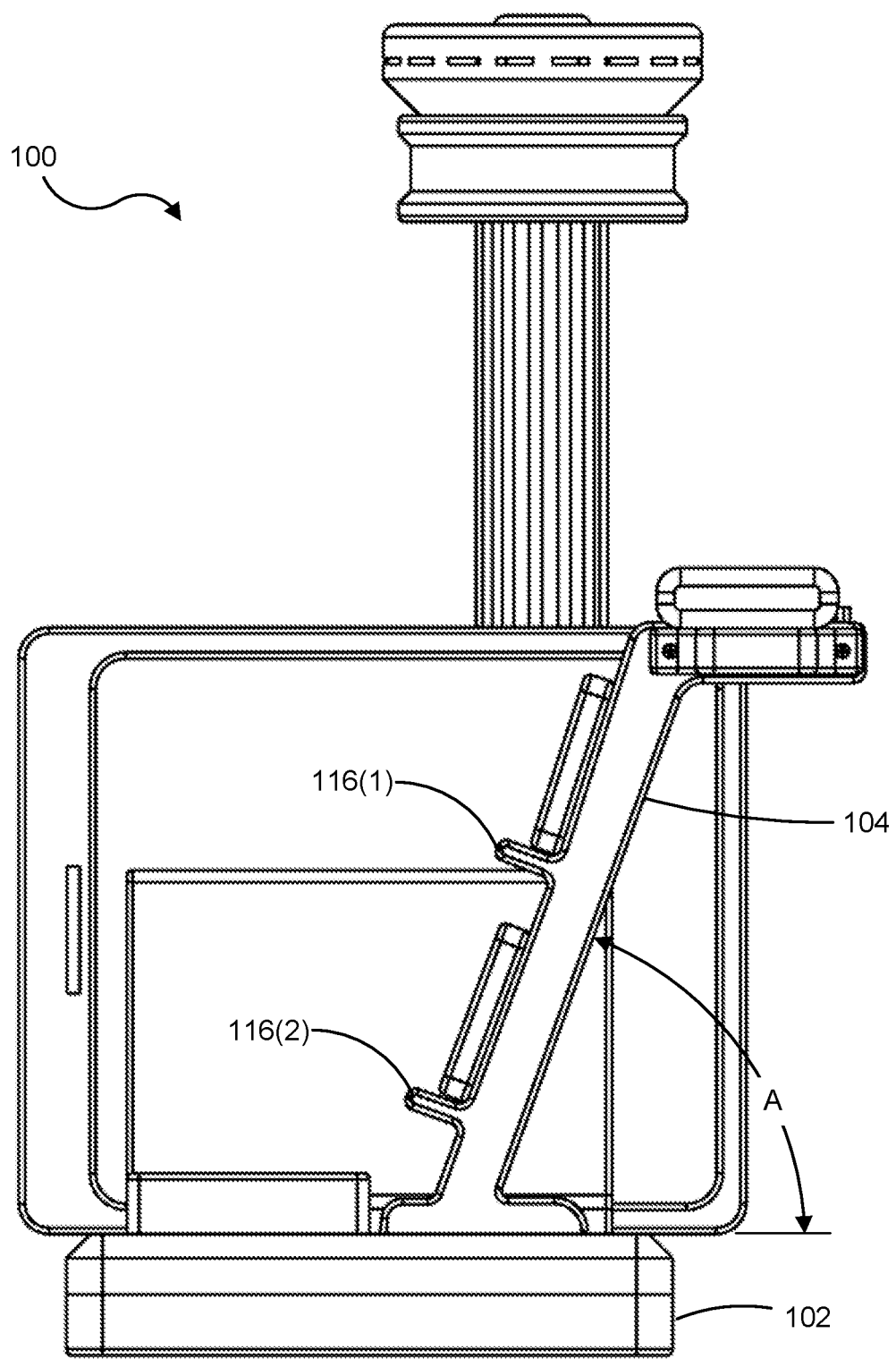
FIG. 2 is a side view in elevation of the charging station shown in FIG. 1.

As shown in FIG. 2, the angled wall 104 can include one or more shelves 116 positioned to support a corresponding device 10 on the angled charging wall 104. The wall 104 can be positioned with respect to the base 102 at an angle A. In some embodiments, angle A is approximately 60 degrees.

Figure 3:
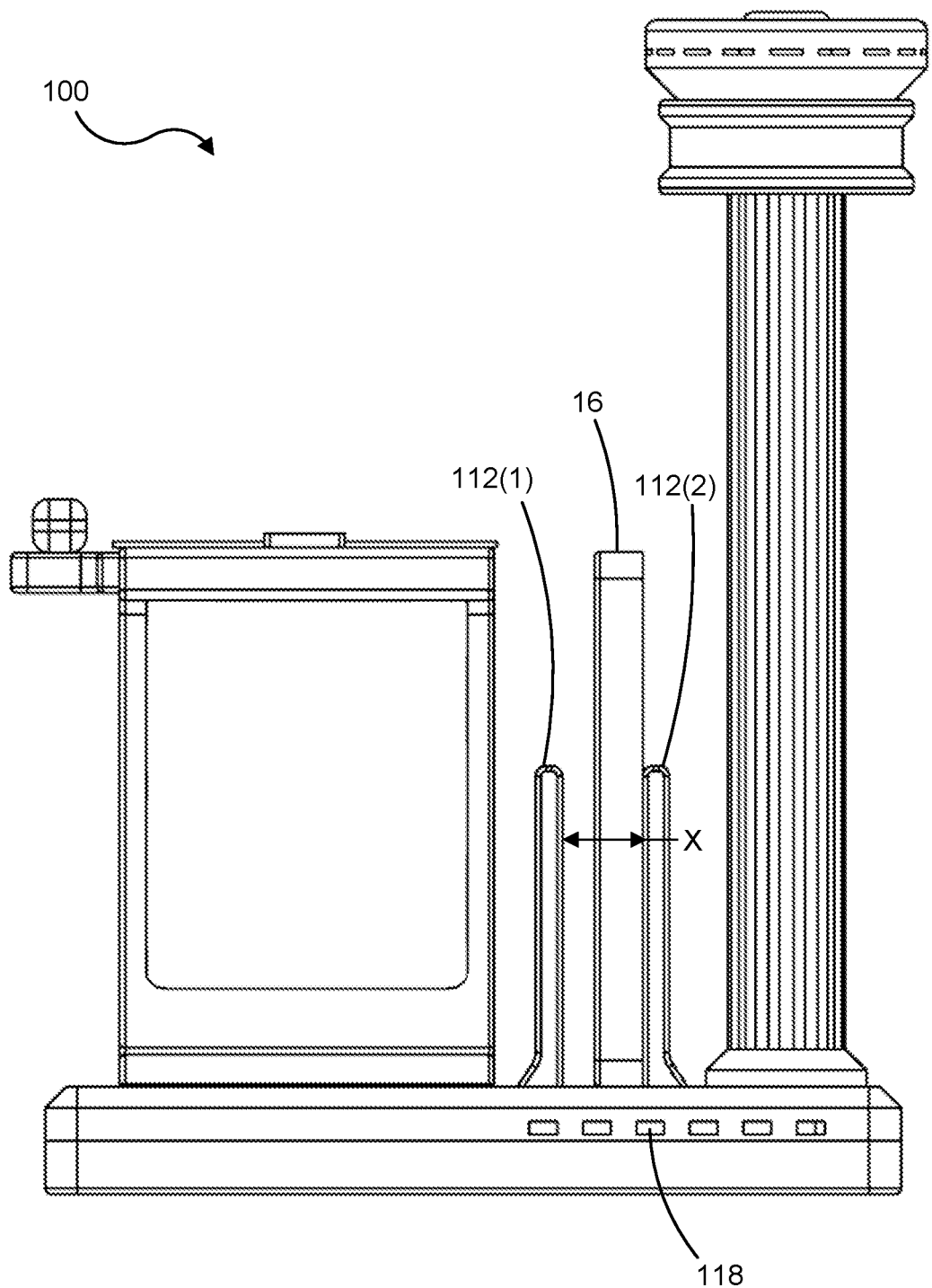
FIG. 3 is a back view in elevation of the charging station shown in FIGS. 1-2.

With reference to FIG. 3, the vertical charging walls 112 can be spaced apart a distance X in order to accommodate the tablet devices 16. In some embodiments, distance X can be approximately 1.0 inch. Also shown in FIG. 3, the base 102 can include multiple charging ports 118, such as various USB ports. These ports can be used to charge devices using a suitable cable (not shown).

Figure 4:
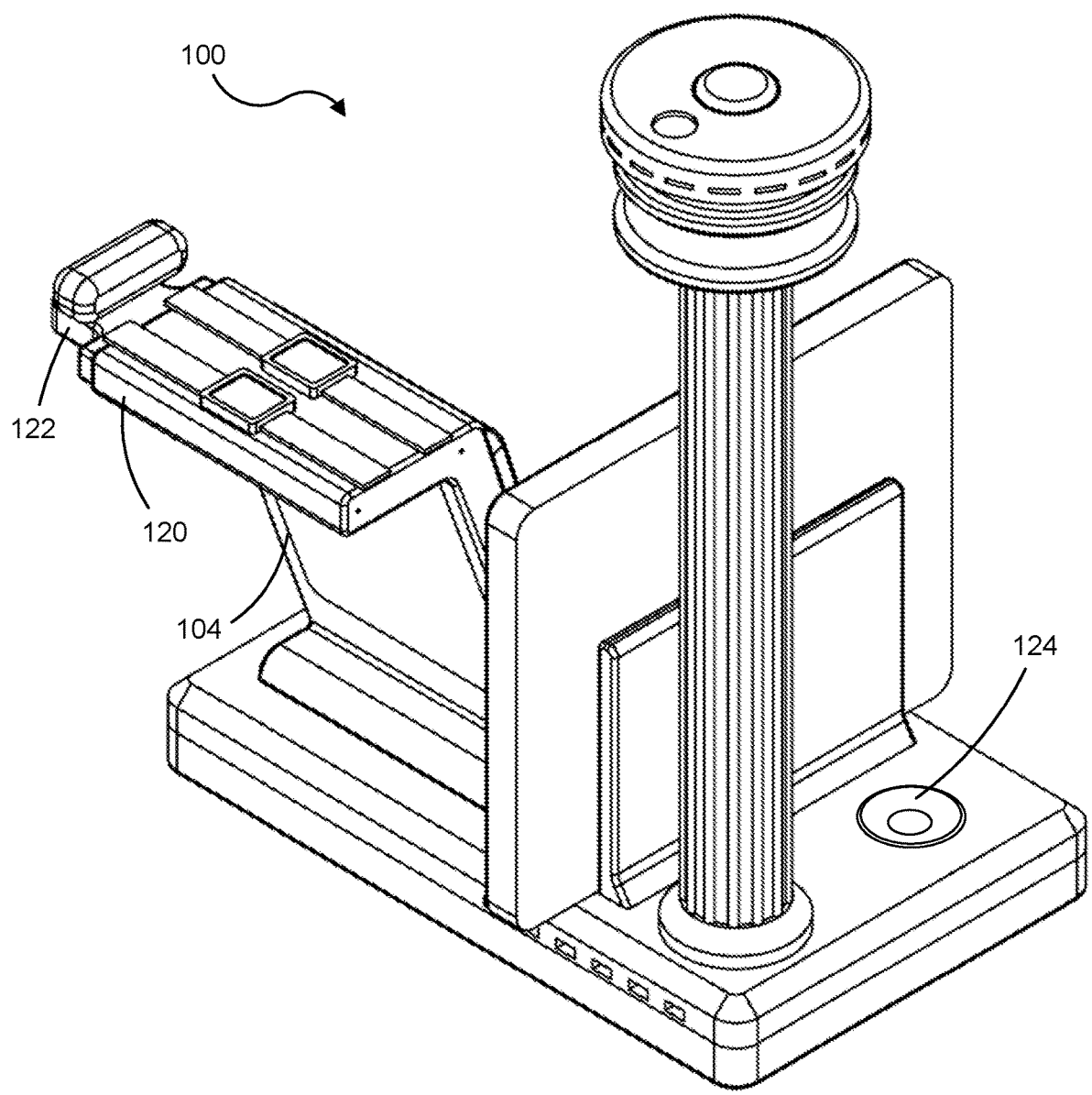
FIG. 4 is an isometric view of the charging station shown in FIGS. 1-3 as viewed from the back.

As shown in FIG. 4, a horizontal tray 120 extends from a distal end of the angled wall 104 and is configured to carry e.g., smart watches for charging. An ear pod charger 122 extends from the side of the tray 120. As best shown in FIG. 4, the charging station 100 can also include an audible warning device, such as speaker 124.

Figure 5:
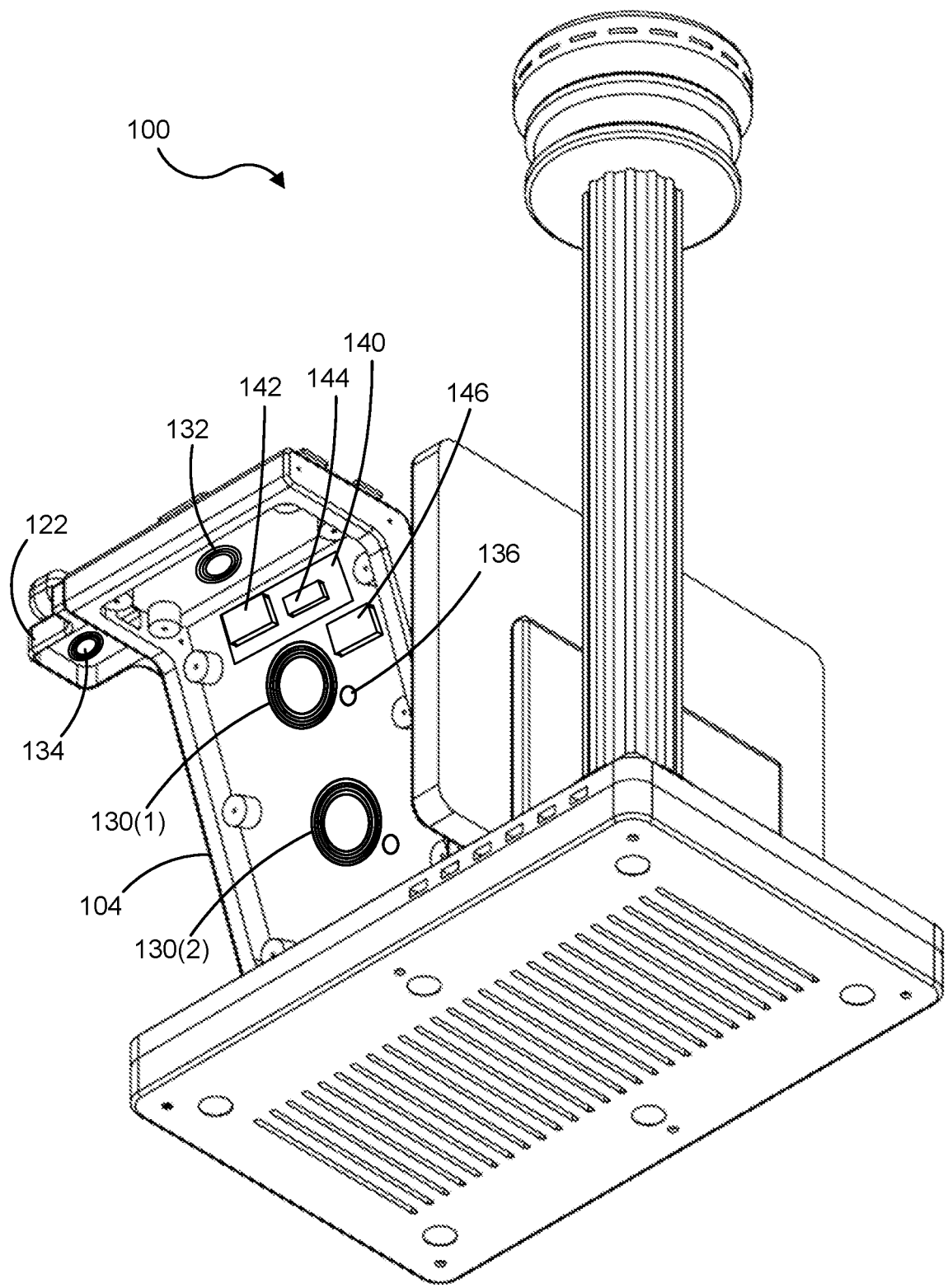
FIG. 5 is an isometric view of the charging station shown in FIGS. 1-4 as viewed from the back and below.

FIG. 5 depicts the charging station 100 with the cover removed from the angled wall 104 to show internal components of the device. For example, the charging wall 104 contains inductive charging coils 130 and 132 to charge smart phones and watches, respectively. The ear pod charger 122 can also contain an inductive charging coil 134.

In some embodiments, the charging station 100 can include a controller 140 (e.g., processor 142 and memory 144). The controller 140 can be configured (e.g., memory 144 is programmed with processor instructions) to receive signals from the smoke detector and the carbon monoxide detector 106 and in response, activate speaker 124 and illuminate at least one of the light pole 108 and the cylindrical light 110 (FIG. 1). The controller 140 can also be configured to disconnect power to the inductive chargers in the event that smoke or carbon monoxide is detected. The charging station 100 can also include temperature sensors 136 that can warn of an overheating device and disconnect power before a problem occurs. In some embodiments, the charging station 100 includes a communication module 146. Communication module 146 can be a wireless communication device using mobile communication technology such as 4G LTE or 5G, Bluetooth®, and/or near-field communications (NFC), for example. However, any suitable wireless communication can be used. Accordingly, the controller 140 and communication module 146 can automatically contact emergency services as necessary. In addition, a user's smart device can be used to configure settings on the charging station 100, such as night light on/off hours, light colors, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A charging station, comprising:
a base;
at least one inductive charger carried by the base;
a smoke detector supported by the base;
a carbon monoxide detector supported by the base;
a pole extending from the base, and
a controller configured to receive a signal from the smoke detector or the carbon monoxide detector and in response,
disconnect power to the at least one inductive charger, and
illuminate one or more lights positioned on the pole.

2. The charging station of claim 1, further comprising an angled wall extending from the base wherein the at least one inductive charger is enclosed by the angled wall.

3. The charging station of claim 2, wherein the angled wall includes one or more shelves to support a device thereon.

4. The charging station of claim 1, wherein the smoke detector and the carbon monoxide detector are contained in a cylindrical housing disposed on the pole upwardly extending from the base.

5. The charging station of claim 4, wherein the one or more lights extend along a length of the pole.

6. The charging station of claim 5, further comprising a cylindrical light positioned on the pole.

7. The charging station of claim 6, further comprising the controller configured to receive the signal from at least one of the smoke detector and the carbon monoxide detector and in response, illuminate the cylindrical light.

8. The charging station of claim 1, further comprising a pair of vertically oriented charging walls, each having an inductive charging coil positioned therein.

9. The charging station of claim 1, further comprising a horizontal tray extending from a distal end of an angled wall extending from the base.

10. A charging station, comprising:
a base;
an angled wall extending from the base;
at least one inductive charger enclosed in the angled wall;
a smoke detector supported by the base;
a carbon monoxide detector supported by the base;
a pole extending from the base; and
a controller configured to receive a signal from at least one of the smoke detector and the carbon monoxide detector and in response,
disconnect power to the at least one inductive charger, and
illuminate one or more lights positioned on the pole.

11. The charging station of claim 10, wherein the angled wall includes one or more shelves to support a device thereon.

12. The charging station of claim 10, wherein the smoke detector and the carbon monoxide detector are contained in a cylindrical housing disposed on the pole upwardly extending from the base.

13. The charging station of claim 12, wherein the one or more lights extend along a length of the pole.

14. The charging station of claim 13, further comprising a cylindrical light positioned on the pole.

15. The charging station of claim 14, wherein the controller is further configured to receive the signal from at least one of the smoke detector and the carbon monoxide detector and in response, illuminate the cylindrical light.

16. The charging station of claim 10, further comprising a pair of vertically oriented charging walls, each having an inductive charging coil positioned therein.

17. The charging station of claim 10, further comprising a horizontal tray extending from a distal end of the angled wall.

* * * * *